US009664220B2

(12) United States Patent
Matheisl et al.

(10) Patent No.: US 9,664,220 B2
(45) Date of Patent: May 30, 2017

(54) COMPONENT WITH A FASTENING DEVICE FOR ATTACHMENTS

(75) Inventors: Michael Matheisl, Vösendorf (AT); Robert Schulz, Vienna (AT); Thomas Illedits, Neufeld (AT); Uwe Hauer, Nienburg (DE)

(73) Assignee: INVENTIO AG, Hergiswil (CH)

( * ) Notice: Subject to any disclaimer, the term of this patent is extended or adjusted under 35 U.S.C. 154(b) by 1 day.

(21) Appl. No.: 13/547,135

(22) Filed: Jul. 12, 2012

(65) Prior Publication Data

US 2013/0177351 A1 Jul. 11, 2013

(30) Foreign Application Priority Data

Jul. 21, 2011 (EP) .................................... 11174899

(51) Int. Cl.

*F16B 17/00* (2006.01)
*B66B 23/00* (2006.01)
*B66B 23/14* (2006.01)

(52) U.S. Cl.

CPC .............. *F16B 17/00* (2013.01); *B66B 23/00* (2013.01); *B66B 23/14* (2013.01); *Y10T 403/602* (2015.01)

(58) Field of Classification Search

CPC ......... B66B 23/00; B66B 23/14; B66B 7/024; F16B 17/00; F16B 2/02; F16B 2/248; F16B 5/0635; F16B 5/06; F16L 3/24; E04B 9/16

USPC ............... 403/346, 347, 373, 382, 397, 400; 24/545, 546, 566; 198/326, 321, 860.2; 248/72, 228.7, 231.81; 52/506.8

See application file for complete search history.

(56) References Cited

U.S. PATENT DOCUMENTS

| | | | | |
|---|---|---|---|---|
| 3,102,614 A | | 9/1963 | Lydard | |
| 3,187,856 A | * | 6/1965 | Lydard | 52/667 |
| 3,614,340 A | * | 10/1971 | Harmsen | 191/32 |
| 3,867,802 A | * | 2/1975 | Murphy | 52/481.1 |
| 3,984,960 A | * | 10/1976 | Raio et al. | 52/489.1 |
| 4,559,751 A | * | 12/1985 | Rogers | 52/665 |
| 6,327,758 B1 | * | 12/2001 | Petrakis et al. | 24/546 |
| 6,371,249 B1 | | 4/2002 | Schops et al. | |
| 6,971,146 B2 | * | 12/2005 | Gessner et al. | 24/295 |

FOREIGN PATENT DOCUMENTS

| | | | | |
|---|---|---|---|---|
| CH | 561 659 A5 | | 5/1975 | |
| DE | 1500692 A1 | * | 4/1969 | F16B 5/0642 |
| DE | 101 26 833 A1 | | 4/2002 | |
| EP | 1 679 280 A1 | | 7/2006 | |
| GB | 722900 A | | 9/1952 | |
| JP | 58 064677 U | | 4/1983 | |
| JP | 1 127586 A | | 5/1989 | |
| JP | 10 077172 A | | 3/1998 | |
| SU | 1 000 369 A1 | | 2/1983 | |
| SU | 1 027 128 A | | 7/1983 | |

* cited by examiner

*Primary Examiner* — Matthieu F Setliff
(74) *Attorney, Agent, or Firm* — Ladas & Parry LLP

(57) ABSTRACT

A component of an escalator, a moving walkway or an elevator includes a fastening device, which includes a spring element, a detent point for detenting the spring element and a support point for support of an attachment to be fastened. The spring element is pivotably arranged at the component, wherein in a stressed state the spring element is detented in the detent point and the attachment is pressed by the stressed spring element against the support point.

15 Claims, 7 Drawing Sheets

COMPONENT WITH A FASTENING DEVICE FOR ATTACHMENTS

CROSS-REFERENCE TO RELATED APPLICATION

This application claims priority to European Patent Application No. 11174899.2, filed Jul. 21, 2011, which is incorporated herein by reference.

FIELD

The disclosure generally relates to components for escalators, moving walkways or elevators.

BACKGROUND

Elevator installations comprise guide rails which are arranged in the elevator shaft and which serve for guidance of an elevator cage and a compensating weight movably arranged in the elevator shaft. The guide rails are either arranged at a shaft frame or connected with the (concrete) shaft wall by means of a wall mount. The guide rails are usually firmly clamped to the wall mounts by means of clamping claws.

EP 1 679 280 describes an escalator comprising two supporting side walls or framework walls, which are connected together by means of transverse struts. Track rails are arranged at the side walls. These track rails serve for guidance of a step chain which is arranged between a first deflecting region and a second deflecting region. Correspondingly, the step belt of the escalator has a forward run and a return run, wherein two respective track rails are provided for each of the forward run and the return run. The track rails are fixedly connected with the side walls by means of a plurality of spring clips. The fastening of the track rails to the side walls or transverse struts by means of spring clips represents, by comparison with welding or screw-connecting of these components, a substantial simplification of assembly and has proved best in practice.

SUMMARY

In at least some embodiments, a component has a fastening device which includes a spring element, a detent point for detenting the spring element and a support point for support of an attachment to be fastened. In various embodiments the spring element is pivotably arranged at the component, wherein in a stressed state the spring element is detented in the detent point and the attachment is pressed against the support point by the stressed spring element.

The fastening device described here can enable problem-free mounting, but also rapid demounting of the attachments by hand without requiring use of a tool. This can ease production of an escalator or a moving walkway, and also installation and maintenance thereof. Worn attachments such as tracks, track rails and guide rails can be exchanged by virtue of the fastening device within a short time, for example a few hours. Moreover, a high clamping force can be generated on the attachment even when the spring element has a substantially smaller spring constant than the spring clip known from the prior art. This can be made possible by the pivotable arrangement of the spring element at the component. In that case the pivot axis of the spring element acts as a lever bearing of the spring element and the spring element itself as a clamping lever.

In a first embodiment of the fastening device the spring element comprises a bearing point by which the spring element is pivotably arranged at the component. In addition, the spring element includes a clamping point and a lever end, wherein a shorter lever arm is arranged between the bearing point of the clamping point and a longer lever arm between the clamping point and the lever end. When the spring element is stressed the attachment is arranged between the support point and the clamping point. Depending on the respectively selected translation ratio between the short lever arm and the long lever arm the spring element can detent in the detent point with a greater or lesser expenditure of force in the case of a predetermined clamping force. Through the use of a spring element as a clamping lever the fastening device is particularly free of susceptibility to tolerance differences of the component, spring element and attachment. Even greater differences in the production dimensions of two fastening devices yield only small differences in the clamping force acting on the attachment.

In a second embodiment of the fastening device the spring element is constructed with mirror symmetry with respect to its longitudinal direction and has a bearing point by which the spring element is pivotably arranged at the component. Moreover, the spring element has, through the construction with mirror symmetry, two spring limbs, wherein each spring limb has a clamping point and a lever end. A respective shorter lever arm is arranged between the bearing point and each clamping point and a respective longer lever arm is arranged between the clamping points and the lever ends. When the spring element is stressed, the component is arranged between the spring limbs and the attachment is arranged between the support point and the clamping points.

The second embodiment has at least some characteristics of the first embodiment. Additionally, in the second embodiment the spring element is trapped by the component in orthogonal direction with respect to the clamping force and therefore has generally no sensitivity to lateral forces which might act on the spring element. Correspondingly, this embodiment can have an even higher degree of stability and security against unintended loosening than the first embodiment.

The spring element can be produced integrally from the component. This integral construction can, however, restrict design freedom, since the component is usually made from a constructional steel, for example S235JR+AR (tensile strength 360 N/mm$^2$ according to EN 10025-2:2004-10). This constructional steel has a lower tensile strength than spring steel, for example 38Si7, which has a tensile strength of 1300-1600 N/mm$^2$. Accordingly, the component and the spring element can be constructed as separate parts, wherein the component is made of constructional steel and the spring element of spring steel.

The clamping point of the spring element can be formed by an angled fold simple to produce. This can mean that the clamping point has a radiussing which is directed towards the attachment and, during clamping, permits a relative movement between the surface of the attachment and the clamping point of the spring element. In addition, by virtue of the angled fold the point of force introduction of the clamping force at the attachment is given with sufficient precision.

In order to facilitate the mounting and clamping of the spring element, the long lever arm can be at least twice as long as the short lever arm.

The fastening device can be used at many points within an escalator or moving walkway for connection of components. For example, the component can be a framework or support structure, which is formed from load-bearing side walls and transverse struts, of an escalator or moving walkway and the attachment can be a frame or a module of an escalator or a moving walkway. Usually designated as a frame is a flat component which protrudes from the supporting structure towards the inner side thereof and at which attachments such as track rails, guide rails and tracks can be arranged. In addition, they usually serve for stiffening of the supporting structure, particularly with respect to the torsional stiffness thereof.

Sections of the escalator or moving walkway are termed modules. These can be of different construction in correspondence with the function thereof. For example, a first module can have a first deflecting region of the step chain, a second module can include the driving and deflecting region of the step chain and further, identical intermediate modules with side walls and transverse struts can be present. An intermediate module can also comprise a plurality of frames which are connected together by track rails, running rails and/or guide rails, wherein one or more intermediate modules can be inserted into an existing support structure. Through the joining together of two or more modules the two deflecting regions of the step chain can be connected together.

The frame or the module of an escalator or a moving walkway can now comprise even further fastening devices for further attachments. Thus, the frame or the module is the component and the attachment is a track rail, running rail or guide rail.

The fastening device can, however, also be used in elevator construction. The component can, for example, be a wall mount arranged in an elevator shaft or a shaft frame arranged in the elevator shaft. A running rail of an elevator cage and/or a compensating weight can, as attachments, be connected by means of the fastening devices with the wall mount or the shaft frame.

The detent point can be constructed in different ways. In a first embodiment the detent point can be formed at the component. In a further embodiment the detent point can comprise an insert part fastenable to the component. The insert part and the component can be designed in such a manner by projections, for example in the form of hooks, and recesses that the insert part is fixed by these and by means of the support force of the spring limb to the component. In addition, the clamping force of the spring element can be adapted to the conditions of use by means of differently designed insert parts.

In order to facilitate detenting of the spring element to be clamped a spreader wedge can be formed at the detent point. This can be constructed at the component, but also at the insert part.

The detent point can have specific characteristics which influence the operating behavior of the escalator, moving walkway or elevator. For example, the insert part can be made of plastics material so that vibrations can be damped and operating noises thereby reduced. The detent point can obviously also have differently constructed damping elements. Thus, plastics material inserts arranged in the region of contact between the spring element and the detent point are also conceivable.

Since the clamping force of the spring element acts only in one direction, the support point possibly has at least one abutment point for limitation of at least one movement direction of the attachment. The abutments not only limit one or more movement directions of the attachment relative to the component, but can also serve as assembly aids. For example, a running rail can be placed in the support points of the frame, wherein the abutment points prevent slipping of the running rail out of the support points.

The support point can additionally have a slide surface. This can be important for guide rails of an elevator shaft. Buildings of concrete can over time exhibit substantial contraction, which leads to shortening of the elevator shaft length. The distances between the wall mounts in the elevator shaft correspondingly also change. The guide rails of steel do not have this contraction. If between the wall mounts and the guide rail no relative movement parallel to the length direction of the elevator shaft were to be possible, the guide rails or the wall mounts would deform or even be destroyed. The same can also happen due to temperature fluctuations in the elevator shaft, since concrete and steel have different coefficients of thermal expansion.

The slide surface can be a smooth surface of the support point, but a plastics material intermediate layer can also be arranged between the support point and the attachment. However, in the case of a plastics material intermediate layer the permissible surface pressure of the material is to be observed so that the clamping force of the spring element is not unacceptably reduced due to creep. In addition, compensation for dimensional differences due to construction can be provided by the plastics material intermediate layers, in which case a set of plastics material intermediate layers of different thickness is, required. The plastics material intermediate layers can have the form of a slide shoe or a slide insert.

The support point can, however, also have slide-inhibiting means. These can be used particularly in the case of escalators and moving walkways, since there the environment of the track rails, running rails or guide rails is similarly usually of steel and a rigid connection of these attachments with the components such as frames, transverse struts and side parts is desired. As anti-slip means it is possible to construct, for example, tooth profiles or profiles with sharp points at the support point, the teeth of which penetrate into the contacting surface of the attachment as a consequence of the spring force of the spring element. In addition, rough surfaces such as, for example, abrasive coatings applied to the support point can also be used.

The fastening device is possibly so designed that the reaction force to the external forces acting on the attachment is oriented in the same direction as the clamping force of the spring element acting on the attachment. The external forces thereby do not oppose the clamping force and it is not possible to overcome the clamping force. Lifting of the attachment off the support point can thus be prevented.

BRIEF DESCRIPTION OF THE DRAWINGS

The component of an escalator, a moving walkway or an elevator with a fastening device is explained in more detail in the following on the basis of examples and with reference to the drawings, in which.

DETAILED DESCRIPTION

Figure 1:
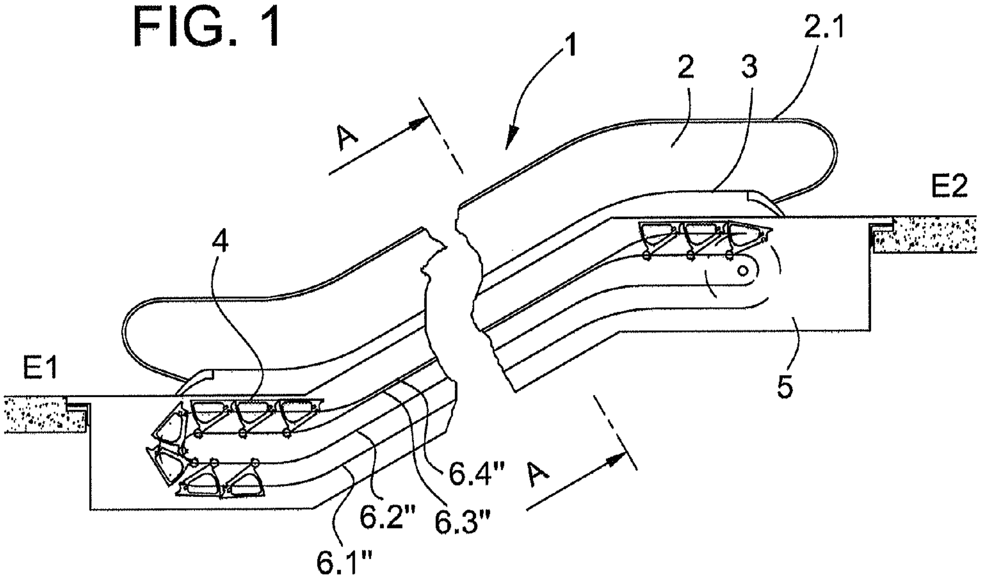
FIG. 1 shows, in schematic illustration, an escalator with track rails and with a step belt.
Figure 2:
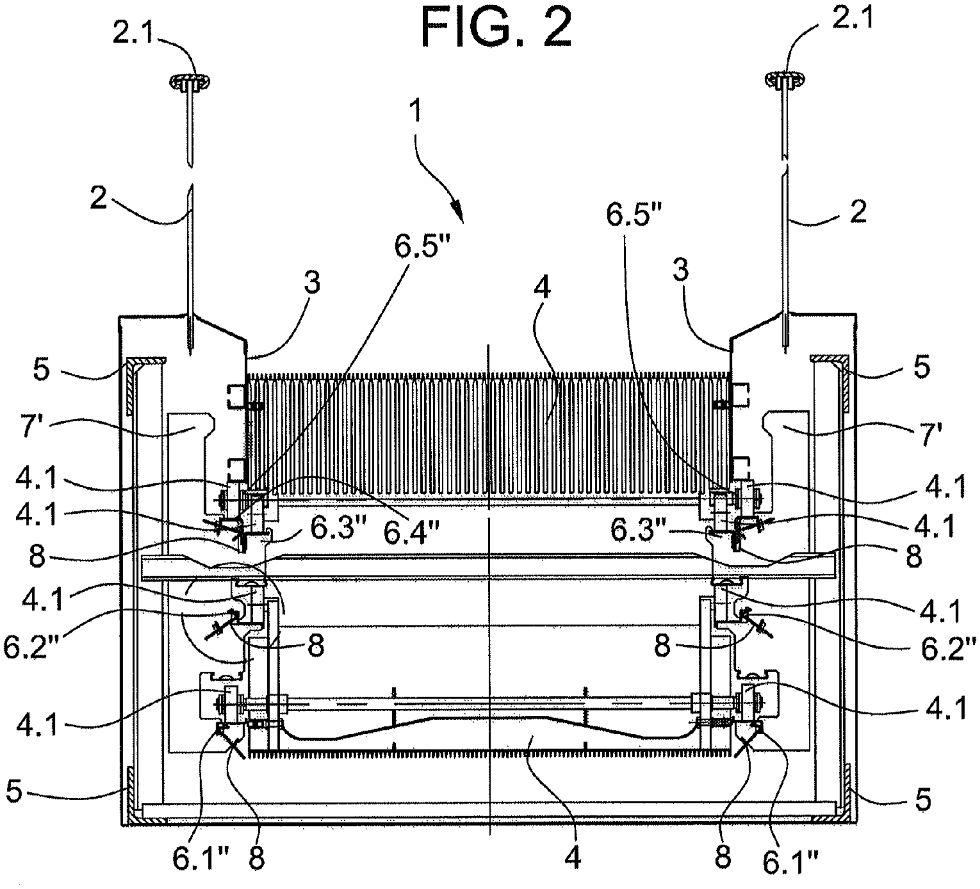
FIG. 2 shows a section through the escalator along the line A-A of FIG. 1, with frames as bearers of the track rails.

FIG. 1 and FIG. 2 show an escalator 1 with a balustrade 2, which carries a handrail 2.1, and steps 4 laterally guided between base plates 3. The escalator 1 connects a first story E1 with a second story E2. Guide rollers 4.1 of the steps 4 travel on track rails 6.3", 6.4" or on tracks 6.1", 6.2", which are fastened at the frames 7 by the fastening devices 8. In addition, two guide rails 6.5 are also fixed to the frame 7 by a fastening device 8. These fastening devices 8 are described in more detail further below with reference to FIGS. 3 to 9. Each frame 7 is connected with a framework 5 of the escalator 1 by means of, for example, a screw connection, weld connection, press-fit connection, rivet connection or through joining (clinching).

Figure 3:
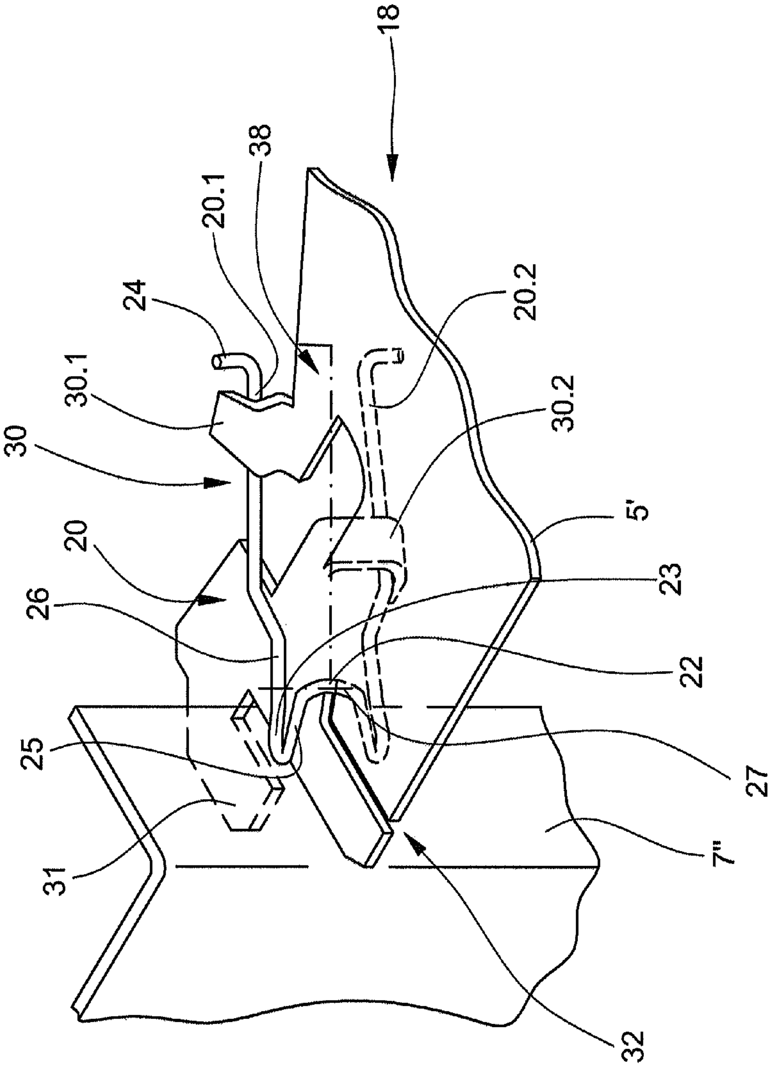
FIG. 3 shows, in three-dimensional view, a construction of a fastening device which detachably connects a frame with a framework or support structure.

As shown in FIG. 3 in three-dimensional illustration the frame as attachment 7" can also be connected with the framework as component 5' by means of a fastening device 18. Since the fastening device 18 is quickly releasable, this form of fastening of the frames as attachments 7" to the framework can be useful if the escalator or moving walkway due to age has to be equipped with new tracks and/or frames.

The fastening device 18 comprises a spring element 20 with two spring limbs 20.1, 20.2 and a bearing point 22. Each spring limb 20.1, 20.2 has a clamping point 23 and a lever end 24. A respective shorter lever arm 25 is arranged between the bearing point 22 and the clamping points 23 and a respective longer lever arm 26 is arranged between the clamping points 23 and the lever ends 24. The spring element 20 is constructed to have mirror symmetry with respect to its longitudinal direction, wherein the mirror plane is arranged between the two spring limbs 20.1, 20.2 and orthogonally to the pivot axis 27 of the bearing point 22.

In addition, a detent point 30 constructed at the component 5', a support point 31 and a mounting receptacle 32 belong to the fastening device 18. The detent point 30 illustrated in FIG. 3 comprises two yokes 30.1, 30.2 formed at the component 5', wherein each yoke 30.1, 30.2 receives a respective long lever arm 26 when the spring element 20 is stressed.

The fastening of the attachment 7" to the component 5' can be simple. Initially, the spring element 20 or the bearing point 22 thereof is inserted into the bearing mount 32 and, in particular, so that the component 5' is arranged between the two spring limbs 20.1, 20.2. However, the two long lever arms 26 do not yet detent in the detent point 30. The two spring limbs 20.1, 20.2 are to be brought into a starting position 38 so that the attachment 7" can be inserted into the support point 31. The attachment 7" is subsequently inserted into the support point 31 and aligned. The two spring limbs 20.1, 20.2 can now be pivoted, lifted over the yokes 30.1, 30.2 and detented under the yokes 30.1, 30,2. Through pivotation of the spring element 20 about the pivot axis 27 the clamping points 23 stand against the attachment 7" and press it against the support point 31 still before the spring limbs 20.1, 20.2 reach the detent point 30. Due to the lever translation of the short lever arm 25 and the long lever arm 26 a very high clamping force or biasing force acting on the attachment 7" can be generated notwithstanding manual assembly.

Figure 4:
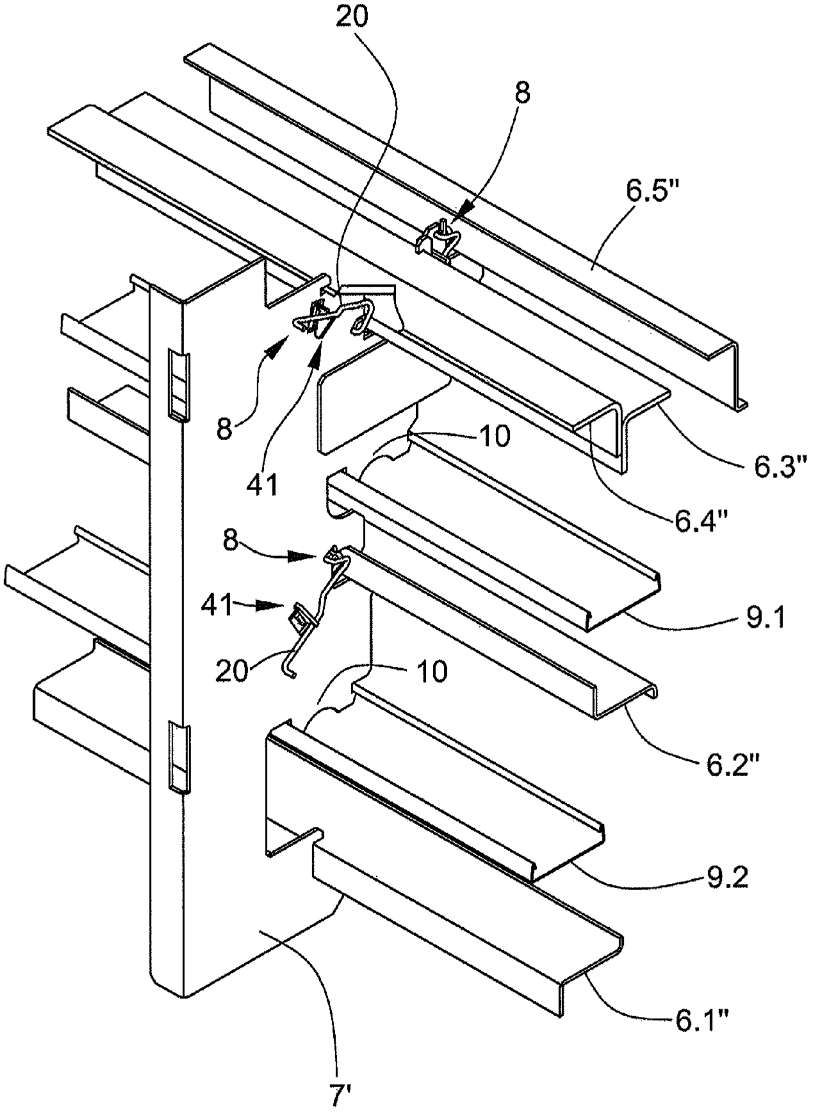
FIG. 4 shows, in three-dimensional view, a frame—which is illustrated in FIG. 2—with tracks, running rails and guide rails, wherein the tracks and running rails are fastened to the frame by fastening devices.
Figure 8:
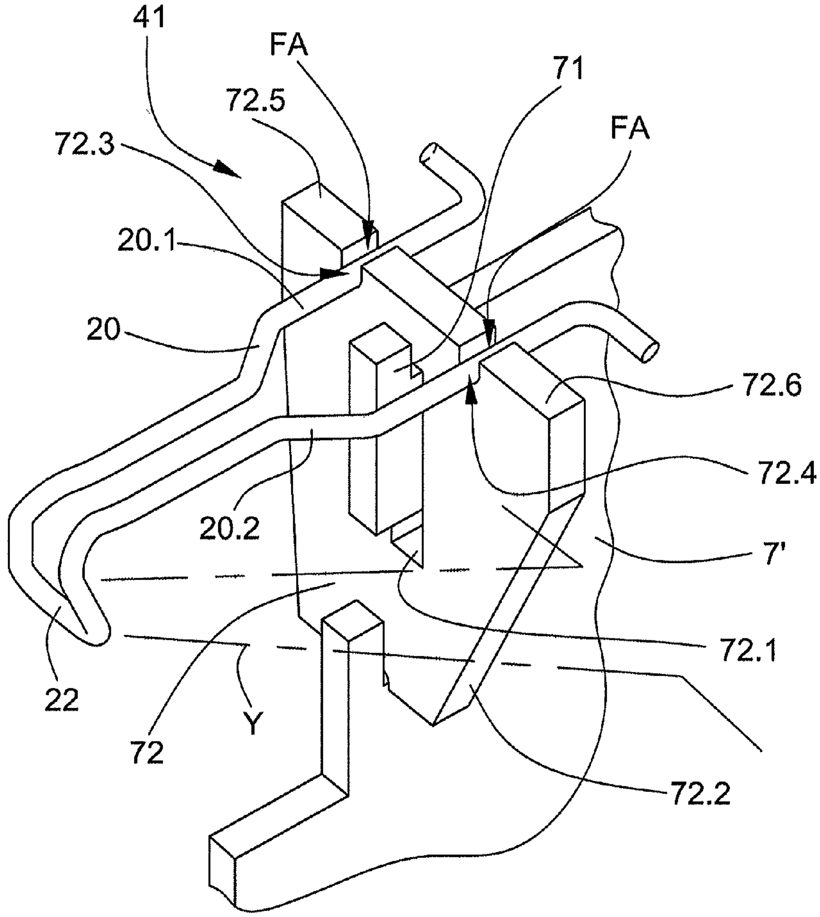
FIG. 8 shows the detent point, which is illustrated in FIGS. 4 to 6 and constructed at the component, in three-dimensional view.

FIG. 4 shows an individual frame of FIG. 2 with attached running rails, tracks and guide rails in three-dimensional illustration. The frame is thus the component 7', the running rails are attachments 6.1", 6.2", the tracks are attachments 6.3", 6.4" and the guide rail is similarly an attachment 6.5". The fastening devices 8 correspond, apart from the differently designed detent point 41, with the fastening device 18 illustrated in FIG. 3, for which reason the same reference numerals are used for identical features. The detent point 41 of the spring element 20 is illustrated in FIG. 8 and explained in more detail further below.

In addition, two guide rails 9.1, 9.2 made of thin sheet metal are arranged at the component 7'. These limit possible lifting of the guide rollers or step rollers, which are not illustrated, off the attachments 6.1", 6.2". The U-shaped guide rails 9.1, 9.2 can by virtue of the small sheet metal thickness be splayed transversely to the length direction and can be detented, without a large expenditure of force, in dovetail feet 10, which are formed at the component 7'. The guide rail 9.1, 9.2 can obviously also be fixed to the component 7' by means of a fastening device 8.

Figure 5:
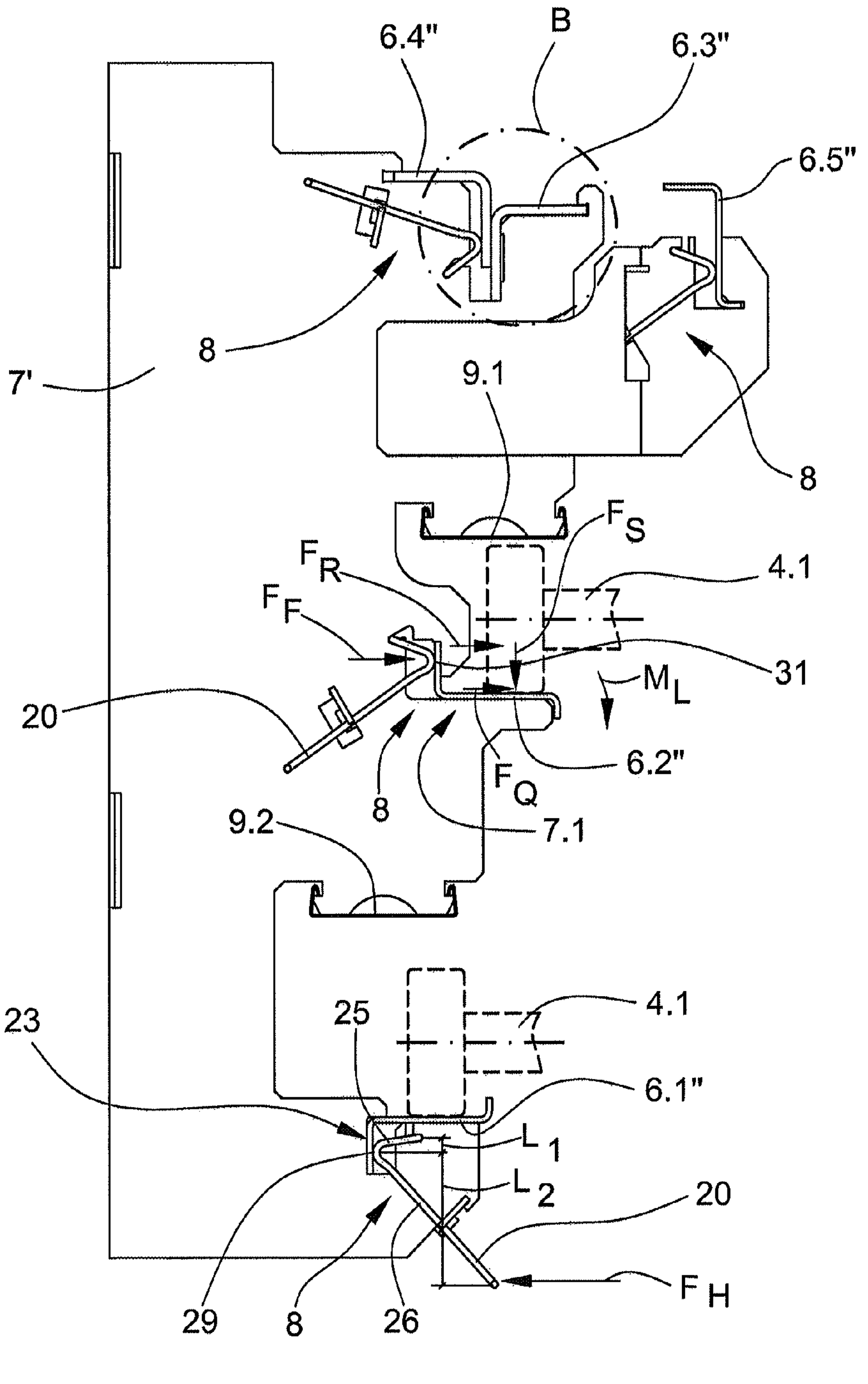
FIG. 5 shows, in plan view, the frame—which is illustrated in FIG. 4—with tracks, running rails and guide rails.

FIG. 5 shows in plan view the frame or component 7', which is illustrated in FIG. 4, with the tracks, running rails and guide rails as attachments 6.1", 6.2", 6.3", 6.4", 6.5". In this view the fastening devices 8 with the clamped spring elements 20 can be seen substantially more easily. The effective lever lengths $L_1$, $L_2$ are also illustrated at the example of an attachment 6.1 (running rail). Due to the angled fold 29 of the spring element 20 and the arrangement of the spring element 20 at the component 7' these are shorter than the associated lever arms 25, 26. The effective lever length $L_2$ of the long lever arm 26 can be dependent on the direction of the manual force $F_H$ to be exerted for the detenting. The effective lever length $L_1$ of the short lever arm 25 changes only slightly when the angled fold 29 or the thereby-formed clamping point 23 has a position which differs, due to production tolerances, from the design position. By design position there is to be understood the theoretical position of the spring element 20 in the stressed state when all dimensions of the spring element 20, the component 7' and the attachment 6.1" are taken into consideration without departures from tolerances. Generally, the clamping point 23 should not exceed the dead center, i.e. the effective lever length $L_1$ of the small lever 25 may not be smaller than 0. If the dead center is exceeded and thus the effective lever length $L_1$ is smaller than 0, the spring element 20 cannot be stressed, since the clamping point 23 with increasing pivot angle of the spring element 20 in clockwise sense and relative to the component 7' moves away from the attachment 6.1". Correspondingly, the fastening device 8 can have a very high security against failure. This is given by the fact that a non-stressable spring element 20 can be immediately recognized during assembly and measures for remedying this, for example insertion of a plate between the clamping point 23 and the attachment 6.1", can be undertaken immediately. Broken or deformed spring elements 20 are immediately recognized, during inspections and/or maintenance operations, by virtue of the absence of clamping force and can be replaced, wherein the number of fastening devices 8 over the length direction of an escalator, a moving walkway or an elevator shaft is to be so selected that the functional reliability can be guaranteed even in the case of failure of individual spring elements 20.

In addition, further features of the spring elements 20 with respect to external forces acting on the tracks and running rails can be illustrated by means of FIG. 5. The external force $F_S$, the clamping force $F_F$ of the spring element 20, the bending moment $M_L$ caused by the external force $F_S$ and the supporting of the moment $M_L$ by the reaction force $F_R$ are illustrated by way of the example of an attachment 6.2" (track). The external force $F_S$ acts by virtue of the mass and the load, which is to be borne, of a step of the escalator or a plate of a moving walkway by way of the guide roller 4.1 on the attachment 6.2". This is supported by the component 7', wherein due to the design of the rail support 7.1 thereof a bending moment $M_L$ is present in the component 7' and a small elastic deformation or a small tipping of the rail support 7.1 could arise due to the bending moment $M_L$. This tipping is counteracted not only by the rail support 7.1, but also, through the folding of the attachment 6.2", the support point 31. This reaction force $F_R$ acting on the support point 31 has the same direction as the clamping force $F_F$ of the spring element 20. In addition, transverse forces $F_Q$ which can similarly act via the guide rollers 4.1 on the attachment 6.2" are also supported by the support point 31.

Figure 6:
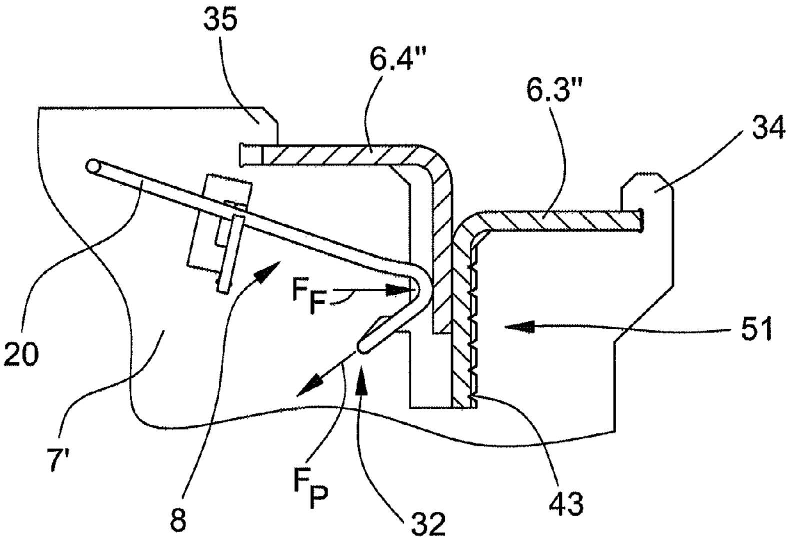
FIG. 6 shows, in plan view and to enlarged scale, the detail B—which is marked in FIG. 5—with a first design of the support points.

FIG. 6 shows in larger-scale illustration the detail B marked in FIG. 5. This shows that two attachments 6.3", 6.4" can also be fastened to the component 7' by one fastening device 8. In at least some cases, three or even more attachments can also be fastened to the component 7' by the fastening devices 8. In particular, the lack of sensitivity of the fastening device 8 with respect to larger production tolerances has a bearing here.

In order that a relative movement in the direction of the length of the attachments 6.3", 6.4" between the component 7' and the contacting attachment 6.3" can be prevented the support point 51 of the component 7' can have a suitable shaping, for example a toothed profile 43. This can have, for example, a higher level of hardness than the material of the attachment 6.3". When the spring element 20 is stressed, the protruding teeth of the toothed profile 43 partly penetrate into the material of the attachment 6.3". This mechanically positive couple prevents any relative movement between the component 7' and the attachment 6.3" in a plane extending orthogonally to the direction of the clamping force $F_F$ of the spring element 20. Here, too, the lack of sensitivity of the fastening device 8 to different depths of penetration can be an important characteristic. The illustrated toothed profile 43 is only by way of example and use can also be made of further suitable toothed profiles 43 or profiles with sharp points. Moreover, a slide-inhibiting coating, for example a flame-sprayed carbide hard-material coating or a slide-inhibiting or slip-resistant intermediate layer can also be arranged between the support point 51 and the attachment 6.3" in place of the toothed profile 43.

The abutment points 34, 35, which are arranged at the component 7' and which limit the movement directions of the attachments 6.3", 6.4" in at least one direction, are also readily recognizable.

Moreover, the design of the mounting receptacle 32, which is formed in the component 7', is also apparent. This is possibly formed not as a bore, but as a slot-shaped recess. The open end of the mounting receptacle 32 possibly extends in the opposite direction to the bearing force $F_P$ of the spring element 20. This design enables simple insertion of the spring element into the component 7'.

Figure 7A:
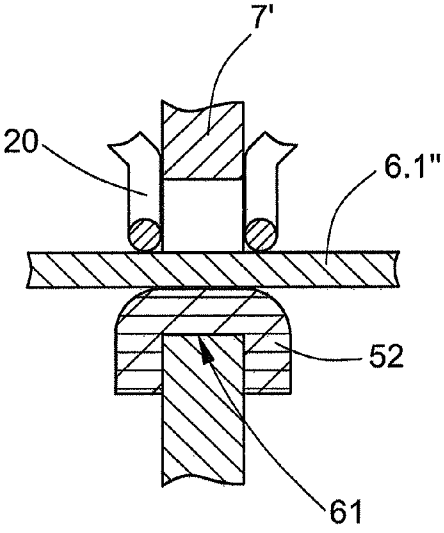
FIG. 7A shows, in sectional plan view, a second design possibility of the support point constructed at the component.

FIG. 7A shows a further design possibility of the support point 61, which is formed at the component 7', in sectional plan view. In this case a relative movement of attachment 6.1" in the direction of its length direction is desired. The attachment 6.1" is mentioned only by way of example and the other attachments (not illustrated) can also be fixed to the component 7' by means of a suitably designed fastening device. A relative movement can be permitted without problems, since the partly illustrated spring element 20 is held in stationary position at the component 7' by the bearing point and detent point (both not illustrated) penetrating the component 7'. In order to assist a possible relative movement, a slide shoe 52 is arranged between the attachment 6.1" and the support point 61. In the illustrated embodiment this is made from a synthetic material with high strength and low creep behavior, for example from a glass fiber-reinforced synthetic material. The slide shoe 52 of synthetic material additionally has characteristic damping vibrations.

Figure 7B:
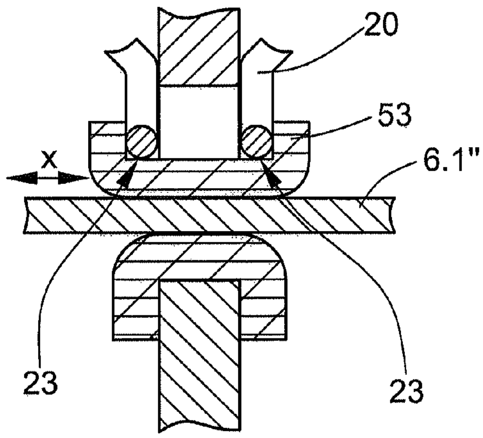
FIG. 7B shows, in sectional plan view, a third design possibility of the support point constructed at the component.

It is also possible, as illustrated in FIG. 7B to arrange between the spring element 20 and the attachment 6.1" a slide insert 53 which improves the slide characteristics and/or vibration-damping characteristics between the attachment 6.1" and the clamping points 23 of the spring element 20. In addition, the clamping points 23 can be mutually supported in the direction of the slide movement X by the slide insert 53 in order to avoid lateral drift.

FIG. 8 shows the detent point 41, which is formed at the component 7', in three-dimensional view. For reasons of clarity the bearing mount formed at the component 7' was not illustrated, for which reason the entire spring element 20 and the bearing point 22 thereof are visible. The detent point 41 comprises a hook 71, which is formed at the component 7', and an insert part 72 with a passage 72.1. In the assembled state the hook 71 extends through the passage 72.1. The insert part 72 is in addition secured in the hook 71 by the supporting forces $F_A$ of the spring element 20. The further the insert part 72 is arranged from the bearing point 22 the lower are the supporting forces $F_A$ acting on the insert part 72. The insert part 72 can be made of metal, for example of steel, but also of synthetic material. An insert part 72 made of synthetic material has the advantage that vibrations within the fastening device are damped so that the operating noises of the escalator, moving walkway or elevator can be minimized.

The insert part 72 comprises a spreader wedge 72.2 which is formed by two lateral chamfers. When the spring element 20 is tensioned the two spring limbs 20.1, 20.2 thereof have to be detented from the starting position Y, which is indicated by dashed lines, in the two recesses 72.3, 73.4 formed at the insert part 72. The spreader wedge 72.2 facilitates spreading apart of the two spring limbs 20.1, 20.2 so that these can be lifted without difficulties over the lugs 72.5, 72.6 of the insert part 72 and detented in the recesses 72.3, 72.4.

Figure 9:
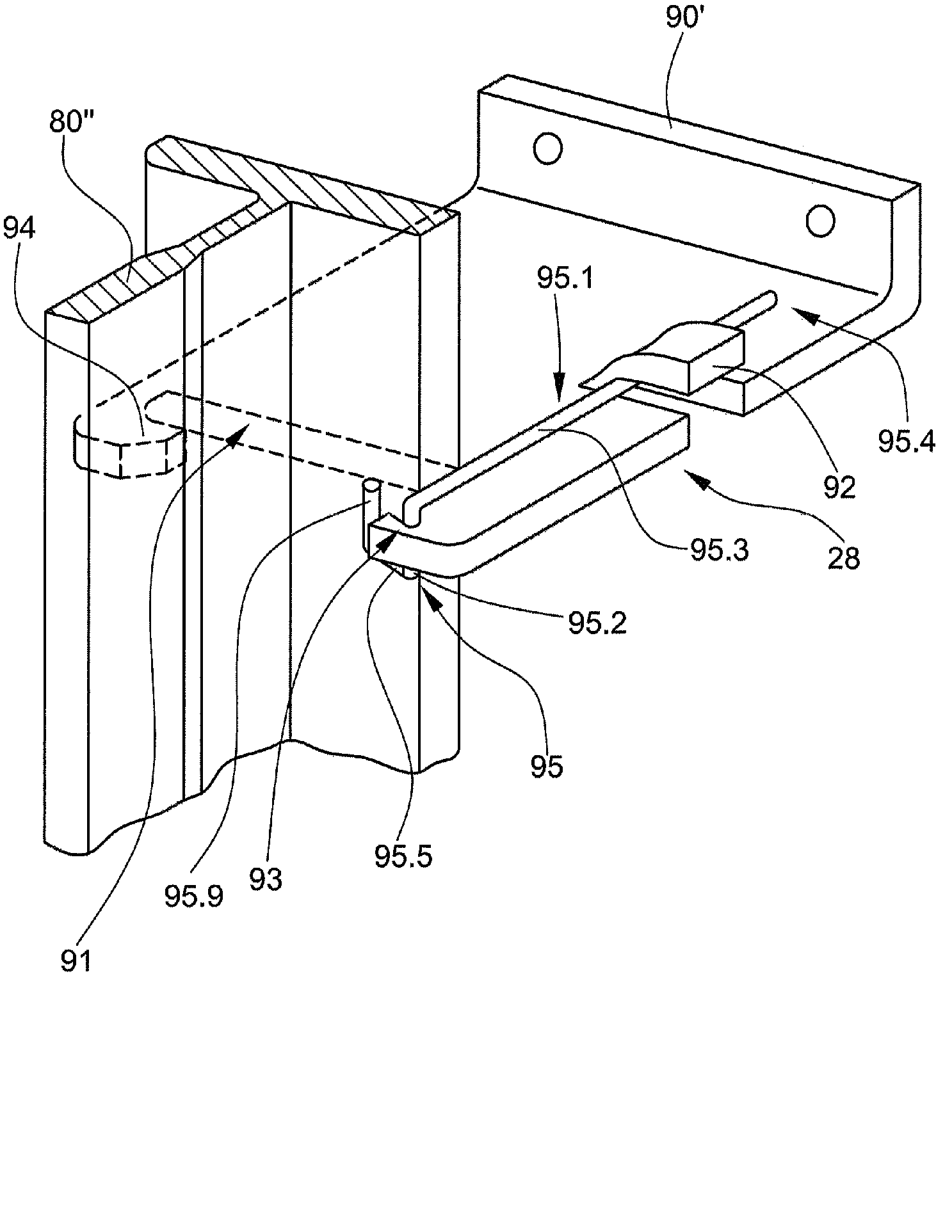
FIG. 9 shows a guide rail of an elevator in three-dimensional view, which is arranged in an elevator shaft (not illustrated).

FIG. 9 shows a guide rail of an elevator in three-dimensional view, which is arranged in an elevator shaft (not illustrated). The elevator cage and/or the compensating weight or counterweight is or are, for example, guided at this guide rail. The guide rail as attachment 80" is fastened to the shaft wall of the elevator shaft by means of a component 90' in the form of a wall mount. The component 90' in turn comprises a fastening device 28. As in the case of the embodiments described in the preceding, a support point 91, a detent point 92 and a bearing mount 93 are formed at the component 90'. The detent point 92 is constructed by means of an S-shaped folding of a region of the component 90' bounded by two parallel sections. The component 90' additionally has an abutment point 94 for limitation of the freedom of movement of the attachment 80".

The illustrated spring element 95 differs from the spring elements of the embodiments described in the preceding by the fact that it has only one spring limb 95.1. The features such as clamping point 95.9, a lever end 95.4, a bearing point 95.2, a shorter lever arm 95.5 and a longer lever arm 95.3 are also present in this spring element 95. In addition, the mode of functioning and the assembly sequence of this fastening device 28 correspond with the preceding embodiments.

Although the disclosed technologies have been described by illustration of specific embodiments, it will be obvious that numerous further variants of embodiment can be created with knowledge of the disclosed embodiments, for example by combining the features of the individual embodiments with one another and/or exchanging individual functional units of the embodiments. For example, the spring element can have only one spring limb in all embodiments. In at least some embodiments, use can be made of slide shoes, slide inserts, damping inserts, toothed profiles or profiles with sharp points and more of the same. It is also conceivable for an attachment, which is fastened to several components, to be connected with the components by differently designed fastening devices. For example, one of the fastening devices can have a toothed profile and all other fastening devices a slide shoe.

Having illustrated and described the principles of the disclosed technologies, it will be apparent to those skilled in the art that the disclosed embodiments can be modified in arrangement and detail without departing from such principles. In view of the many possible embodiments to which the principles of the disclosed technologies can be applied, it should be recognized that the illustrated embodiments are only examples of the technologies and should not be taken as limiting the scope of the invention. Rather, the scope of the invention is defined by the following claims and their equivalents. We therefore claim as our invention all that comes within the scope and spirit of these claims.

We claim:

1. A conveyance apparatus in the form of an escalator, moving walkway or elevator, having at least one clamp connection, the clamp connection comprising a component, a separate fastenable attachment element, and a fastening device element fastening an exterior edge of the component to a surface of the fastenable attachment element with a holding force, the fastening device comprising, a spring element, having:

- a clamping point in contact with the surface of the fastenable attachment element when the spring element is pivoted into a stressed state;
- a unitary bearing point located at a first side of the clamping point and in contact with an exterior edge surface of a slot formed in the component, the spring element being pivotably arranged about an exterior of the component using the bearing point, the spring element not extending through any closed aperture in the component;
- a lever end located at a second side of the clamping point;
- a shorter lever arm extending between the bearing point and the clamping point;
- a longer lever arm portion being longer than the shorter lever arm extending between the clamping point and the lever end and forming a handle for an applied force to pivot the spring element into the stressed state; and
- a detent point abutting against the component for engaging about and detenting the longer lever arm portion of the spring element to the component with the spring element portion in a stressed state and for maintaining the spring element portion in the stressed state;

the fastenable attachment element being arranged between a support point on the component and the clamping point when the spring element is in the stressed state, the spring element being pivotably arranged at the component to press the fastenable attachment element against the support point and apply and maintain the holding force between the bearing point and the clamping point by the shorter lever arm portion when the spring element is pivoted into the stressed state, whereby the ratio of holding force to the applied force is proportional to the ratio of the length of the longer lever arm portion to the shorter lever arm portion.

2. The clamp connection of claim 1, the clamping point comprising an angled fold of the spring element.

3. The clamp connection of claim 1, the longer lever arm being at least twice as long as the shorter lever arm.

4. The clamp connection of claim 1, the component being a support framework of an escalator and the fastenable attachment element comprising a frame or module of the escalator.

5. The clamp connection of claim 1, the component being a support framework of a moving walkway and the fastenable attachment element comprising a frame or module of the moving walkway.

6. The clamp connection of claim 1, the component being a frame or a module of an escalator and the fastenable attachment element comprising a track rail, a running rail or a guide rail.

7. The clamp connection of claim 1, the component being a frame or a module of a moving walkway and the fastenable attachment element comprising a track rail, a running rail or a guide rail.

8. The clamp connection of claim 1, the component being a wall mount arranged in an elevator shaft, the fastenable attachment element comprising a running rail or a guide rail of an elevator cage or of a compensating weight.

9. The clamp connection of claim 1, the detent point detenting the longer lever arm portion to the component.

10. The clamp connection of claim 1 further comprising an insert part positioned between the detent point on the spring element and the component, the detent point detenting against the insert part.

11. The clamp connection of claim 10, the insert part further comprising a spreader wedge.

12. The clamp connection of claim 10, the insert part further comprising a damping element.

13. The clamp connection of claim 1, the component having an abutment point for limiting movement of the attachment element.

14. The clamp connection of claim 1, the support point being embodied in a slide surface, a slide insert or a slide shoe element.

15. The clamp connection of claim 1, the support point being embodied in an element having anti-slip means.

* * * * *